United States Patent
Geng et al.

(10) Patent No.: US 10,402,950 B1
(45) Date of Patent: Sep. 3, 2019

(54) OPTICAL MEASUREMENT SYSTEM

(71) Applicant: Facebook Technologies, LLC, Menlo Park, CA (US)

(72) Inventors: Ying Geng, Sammamish, WA (US); Stephen James McNally, Woodinville, WA (US); Brett Joseph Bryars, Santa Rosa, CA (US); Scott Charles McEldowney, Redmond, WA (US); Alexander Jobe Fix, Seattle, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 91 days.

(21) Appl. No.: 15/814,289

(22) Filed: Nov. 15, 2017

Related U.S. Application Data

(60) Provisional application No. 62/422,545, filed on Nov. 15, 2016.

(51) Int. Cl.
*G06K 9/00* (2006.01)
*G06T 5/00* (2006.01)
*G06T 7/80* (2017.01)
*G06F 3/01* (2006.01)
*G02B 27/00* (2006.01)
*G02B 5/12* (2006.01)

(52) U.S. Cl.
CPC .............. *G06T 5/006* (2013.01); *G06F 3/013* (2013.01); *G06T 7/80* (2017.01); *G02B 5/12* (2013.01); *G02B 27/0093* (2013.01)

(58) Field of Classification Search
CPC .... G06T 7/20; G06T 7/80; G06T 5/00; G06T 5/006; G06T 19/006; G06T 2200/04; G06K 9/0061; G09G 5/00; G09G 2320/0693
See application file for complete search history.

(56) References Cited

U.S. PATENT DOCUMENTS

| | | | | |
|---|---|---|---|---|
| 5,642,221 A | * | 6/1997 | Fischer | G02B 27/0172 2/422 |
| 5,889,625 A | * | 3/1999 | Chen | G02B 27/0025 348/807 |
| 5,917,656 A | * | 6/1999 | Hayakawa | G02B 17/0816 250/494.1 |
| 5,959,780 A | * | 9/1999 | Togino | G02B 27/0172 359/630 |

(Continued)

*Primary Examiner* — Amir Alavi
(74) *Attorney, Agent, or Firm* — Fenwick & West LLP

(57) ABSTRACT

Methods for quantifying pupil swim are disclosed in order to compensate for the same. A target image, in one embodiment, is displayed on a display of a head mounted display (HMD). Images of the target image are captured from a plurality of positions relative to an optical axis of an optics block of the HMD at an exit pupil of the HMD. The target image includes features and differences between observed locations of the features and their expected locations absent the optics block are determined. From these differences, a wavefront of the optics block is reconstructed and distortion corrections for the optics block are generated using the wavefront. The distortion corrections, when applied to a virtual scene, add pre-distortion that is canceled by the optical imperfections of the optics block as light of the virtual scene with the pre-distortion passes through the optics block.

20 Claims, 5 Drawing Sheets

(56) References Cited

U.S. PATENT DOCUMENTS

| | | | | |
|---|---|---|---|---|
| 5,986,812 A * | 11/1999 | Takahashi | ........... | G02B 27/0172 |
| | | | | 359/630 |
| 6,097,542 A * | 8/2000 | Takahashi | ........... | G02B 27/0172 |
| | | | | 359/630 |
| 6,104,540 A * | 8/2000 | Hayakawa | ......... | G02B 17/0816 |
| | | | | 359/637 |
| 6,771,423 B2 * | 8/2004 | Geist | ................ | G02B 27/0172 |
| | | | | 345/8 |
| 7,522,344 B1 * | 4/2009 | Curatu | ............... | G02B 27/0093 |
| | | | | 345/8 |
| 7,545,571 B2 * | 6/2009 | Garoutte | ............ | G02B 27/0172 |
| | | | | 345/7 |
| 8,159,751 B2 * | 4/2012 | Martins | ................. | G02B 7/002 |
| | | | | 345/7 |
| 8,305,296 B2 * | 11/2012 | Iba | ...................... | G02B 17/006 |
| | | | | 345/7 |
| 8,373,619 B2 * | 2/2013 | Tsujimoto | ............... | G06T 5/006 |
| | | | | 345/7 |
| 8,814,691 B2 * | 8/2014 | Haddick | ............. | G02B 27/017 |
| | | | | 463/42 |
| 2018/0128685 A1 * | 5/2018 | Peloux | ..................... | G06T 7/90 |

* cited by examiner

OPTICAL MEASUREMENT SYSTEM

CROSS-REFERENCE TO RELATED APPLICATIONS

This application claims the benefit of U.S. Application No. 62/422,545, filed Nov. 15, 2016, which is incorporated by reference in their entirety.

BACKGROUND

Aberrations and distortion exist in every optical system. For optical systems with an exit pupil, such as near-to-eye display systems, aberrations across the pupil result in a "swimming" sensation of the image as the eye moves within the pupil to look at different objects displayed in various locations on a display screen. This is known as "pupil swim" and exists in all near-to-eye display systems. For example, in a head-mounted display (HMD) a user's eye occupies a region of space generally referred to as an eyebox (typically there is a respective eyebox for a left and a right eye of the user). The HMD displays and directs content to the eyeboxes. But as a user moves their eye within an eyebox and/or the position of the HMD changes relative to the position of the user's head, the location of the user's eye within an eyebox may change. Changes in the location of the eye within an eyebox may result in pupil swim, i.e., distortions in the content being presented to the user. Pupil swim can be problematic for HMDs for various reasons including, e.g., increased calibration difficulty, and motion sickness due to problems with vertical disparity.

SUMMARY

Methods for quantifying pupil swim are disclosed in order to compensate for the same when providing a virtual scene for display on a head mounted display (HMD) to a viewing user. In one embodiment, a calibration or target image is displayed on an electronic display of an optical system and images of the target image are captured at different locations around an exit pupil of the optical system; the different locations around the exit pupil include locations that correspond to different eye positions (and viewing angles) for a user viewing content displayed on the electronic display from the exit pupil. The observed locations of features of the calibration, as captured by the images from the exit pupil, are compared to the actual or expected locations of the features in the calibration image to measure the distortion at each position. Optical aberrations across the eyebox are calculated by aggregating the individual distortion measurements from each of the different locations and then "general pupil swim" (including MTF/non-MTF impacting) can be quantified. The second variation does not require images to be captured for on-axis aberration measurement, but instead calculates a wavefront map using the distortion pattern.

The target image, in one embodiment, is displayed by an electronic display of a HMD. The light of the target image leaving the electronic display passes through an optics block of the HMD before arriving at an exit pupil of the HMD. The optics block is inherently associated with one or more optical errors that cause optical aberrations, as mentioned above, that shift features of the target image (e.g., dots of a dot pattern, etc.) from their expected locations (i.e., each dots location relative to each other on the target image) to observed locations as observed from the exit pupil after the light of the target image has passed though the optics block; the optical aberrations, therefore, shift the features of the target image to the feature's observed locations relative to each other (e.g., by bending/distorting the light of the target image). The difference between the expected and observed location are then used to reconstruct the wavefront of the light leaving the electronic display. Analysis of the reconstructed wavefront can then identify which portions of the wavefront are out of phase as a result of the optical aberration of the optics block. From the reconstruction and analysis of the wavefront, a distortion correction is generated. The distortion correction pre-distorts images being displayed by the electronic display by, for example, introducing compensative phase delays that cause the light of the scene displayed by the electronic display to be in phase upon passing though the optics block. Thus, the optical aberrations of the optics block un-distort or cancel the pre-distortion added to the scene by the distortion correction to allow the scene to arrive at the exit pupil of the HMD free of optical aberrations (or at least lessened in degree). The HMD, in one embodiment, includes an eye tracking system and the distortion correction applied to the scene is dependent on the eye position of the user to at least mitigate the effects of pupil swim as observed from the exit pupil of the HMD.

Figure 1:
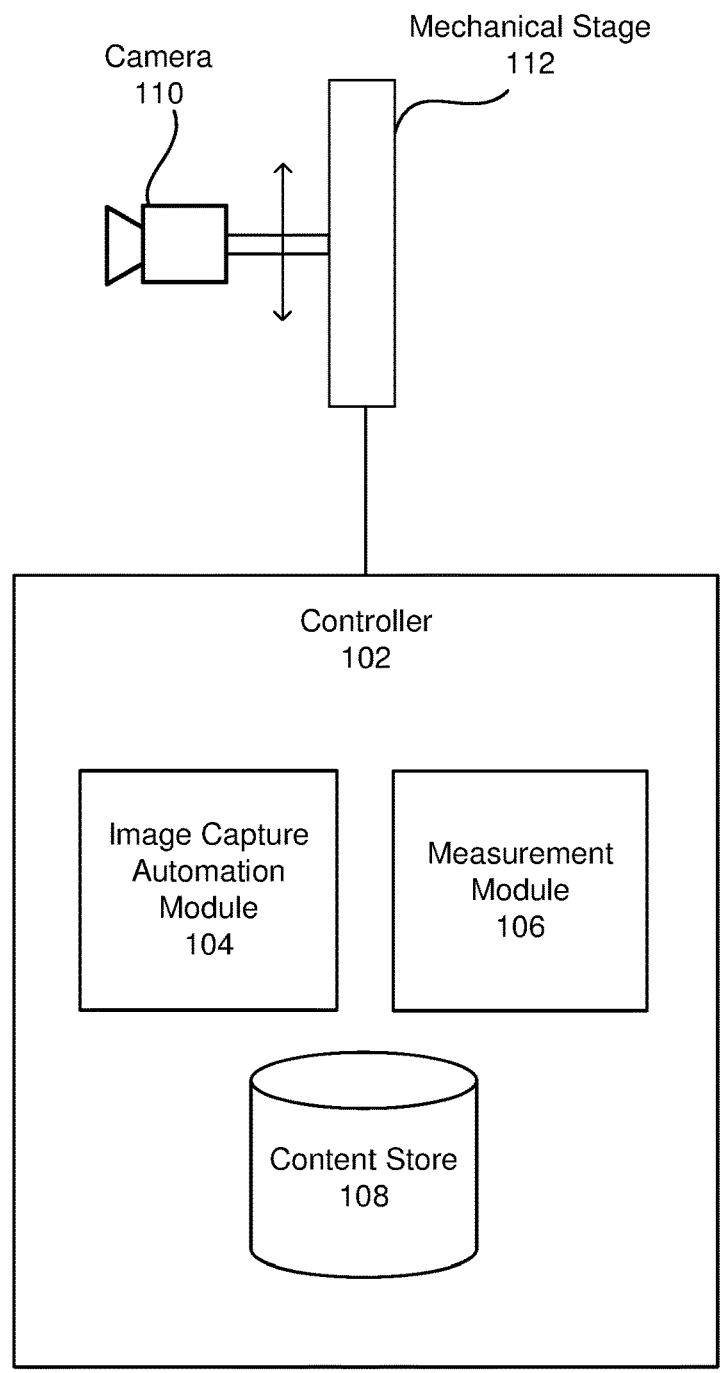
FIG. 1 shows an example optical measurement system, in accordance with at least one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

Pupil swim is the perceived change of an image and image quality as the eye moves within the eyebox of a head mounted display (HMD) or other optical system. This includes several changes to the image. The first and most obvious change is image distortion or the non-uniform shift of each point in an image. A change of lateral color is also related to image distortion; however, the changes in image distortion and lateral color do not impact the monochromatic modulation transfer function (MTF). Accordingly, for near-to-eye display systems, such as a head-mounted display (HMD) with an eye-tracking capability, images displayed by the HMD are re-rendered based on predicted distortion and lateral color as a function of eye position to compensate electronically for these two components of pupil swim on a pixel-by-pixel basis for each color. This type of pupil swim is referred to as "non-MTF-impacting pupil swim."

In contrast, "MTF-impacting pupil swim" is a different type of pupil swim related to how aberrations (or MTF) change as the eye moves within the eyebox. This type of pupil swim is not as easily compensated for by re-rendering individual pixels or sub-pixels. In contrast to "non-MTF-impacting pupil swim," the eye observes a change in image quality, such as blurring as a function of field, as the eye moves within the eyebox. This can be understood by examining the optical wavefront at the pupil, or its derivative, the transverse ray aberrations. As a pupil of an eye moves within the eyebox, the pupil becomes the actual limiting feature when it samples a sub-aperture of the wavefront from the eyebox. The aberration/MTF of the whole HMD is dependent on the wavefront from within the sub-aperture defined by the observer's pupil and, thus, the aberration/MTF change as the user's pupil moves around the eyebox.

For example, if a user's pupil is a quarter of the size of the eyebox (i.e., the pupil is able to receive a quarter of the wavefront associated with the eyebox) when the eye is located at the center of the eye box, the view through the optical system will be dominated by defocus as a function of field and color (i.e., field curvature, axial color, and astigmatism). As the pupil moves to sample a new or different sub-aperture of the wavefront, the user may observe a flip in the sign of defocus (or a change of sign in the slope of the transverse aberration curve), which causes the part of image displayed on the electronic display corresponding to the new sub-aperture of the wavefront to "swim" axially in and out of focus.

Methods for quantifying pupil swim are disclosed in order to compensate for the same. In one embodiment, a target image is display on a display screen of a head mounted display (HMD). The HMD includes an optics block that focuses light from the display screen to an exit pupil of the HMD. However, inherent optical imperfections of the optics block distort the light as it passes through the optics block resulting in optical aberrations that then perceived as pupil swim by a viewing user. Accordingly, images of the target image displayed on the display screen of the HMD are captured from a plurality of positions relative to an optical axis of the optics block at the exit pupil of the HMD.

The target image includes features (e.g., a checkerboard, dot pattern, etc.) and, for each feature of the target image in each captured image, a difference between an observed location of the feature and an expected location of the feature is determined. As mentioned above, the determined differences between the observed locations of features relative to expected locations of features are caused by the optical imperfections of the optics block distort the light as it passes through the optics block. From the determined differences, a wavefront of the optics block of the HMD is generated or reconstructed and one or more distortion corrections for the optics block are generated using the wavefront. For example, the wavefront slope can be computed from the displacements for a least-squares fitting with derivatives of Zernike polynomials. Additionally, information about the wavefront can be interpolated for camera positions for which images of target image were not captured, allowing determination of a continuous model or function of the wavefront. Such a model or function allows distortion corrections to be provided for potential eye positions relative to the exit pupil at a high granularity based on a set of discrete points corresponding to camera positions.

When applied to one or more frames of a virtual scene being displayed by the electronic display of the HMD, each distortion correction pre-distorts the one or more frames of the virtual scene with pre-distortion that is canceled by one or more optical imperfections of the optics block as light for the one or more frames of the virtual scene with the pre-distortion passes through the optics block. For example, an eye tracking system of the HMD determines a current position of an eye of a viewing user wearing the HMD and viewing content being displayed by the display screen of the HMD. Based on the current position of the eye of the user, the HMD selects a distortion correction that is, for example, mapped to the particular position corresponding to the current position of the viewing user's eye. Thus, each distortion correction of a plurality of distortion corrections correspond or are mapped to a different eye position based on the above described calibration. The selected distortion correction is then applied to a virtual scene for the current position of the eye of the viewing user to correct or account for the optical aberrations that are associated with that position when displayed to the user.

Accordingly, as the user looks in a different direction within the virtual scene (i.e., changes their viewing angle relative to the optical axis of the optics block), the eye tracking system of the HMD updates the current eye position of the viewing user that may also necessitate updating the distortion correction being applied to the virtual scene. Thus, in response to tracking the eye of the user to a new updated eye position, the HMD selects an alternative or updated distortion correction from the plurality of distortion corrections for the updated position of the eye. As above, the alternative distortion correction is applied to the virtual scene for the updated position of the eye and virtual scene is displayed on the display screen with the alternative distortion correction to correct or account for optical aberrations associated with the updated eye position.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1 shows one embodiment of optical measurement system 100, in accordance with at least one embodiment. The optical measurement system 100 measures aberrations in an optical system. An aberration is an error that causes a performance departure of an optical system from predictions of paraxial optics. Example aberrations include pupil swim, pincushion distortion, barrel distortion, chromatic, some other error that is present in an optical wavefront, or some combination thereof. The optical measurement system 100 includes a controller 102, a camera 110, and a mechanical stage 112. However, in alternative configurations, different and/or additional components may be included in optical measurement system 100.

Camera 110 is pinhole camera that samples the wavefront at an exit pupil of a device under test (e.g., a head mounted display) by capturing images at predetermined locations. Camera 110 can be a standard CMOS sensor with a low distortion wide angle. Further, camera 110 can be calibrated to remove or compensate for distortion, resulting in each pixel of camera 110 corresponding to a precise angle measurement. Accordingly, the size of the pinhole aperture of camera 110 can be chosen such that the ray angle can be identified for each pixel. Alternatively, camera 110 can be wide angle camera (e.g., a single lens reflex camera). Camera 110 is coupled to mechanical stage 112 and is communicatively coupled to the controller 102.

Mechanical stage 112 is a motorized x-y stage programmed to mechanically move camera 110 to the different predetermined locations around the exit pupil of an optical system. This reduces time and provides a repeatable process that captures the images in precisely known locations to enable accurate calibration or rendering adjustment for each respective location across an eyebox of the optical system. In one example, mechanical stage 112 can be replaced by a robotic arm that moves camera 110 into the different predetermined locations around the exit pupil.

The controller 102 controls camera 110 and mechanical stage 112. Controller 102 includes an Image Capture Automation Module 104, a Measurement Module 106, and a content store 108. However, in alternative configurations, different and/or additional components may be included in optical measurement system 100.

Image Capture Automation Module 104 includes logic and instructions that automate movement of mechanical stage 112 to move camera 110 to the precise locations and to capture the images at those locations. In one example, Image Capture Automation Module 104 and mechanical stage 112 form a computer numerical control (CNC) machine for automated image capture.

Measurement Module 106 obtains the images captured by camera 110 at each of the different predetermined locations around the exit pupil of the optical system. The images captured by camera 110 include distortion resulting from an optics block of the optical system and optical aberrations associated with the optics block can be calculated from the distortion measurements. Distortion itself, at each location around the exit pupil, is independent of any optical aberration; however, the change of distortion, when aggregated and measured across the whole exit pupil, corresponds directly to aberrations and aberrations are directly related to pupil swim. Accordingly, Measurement Module 106 determines how distortion changes as a function of eye position and pupil swim is determined by how much individual points move (relative to reference points) between different locations. Measurement Module 106 may further determine a distortion correction for each location such that when an eye tracking system of a HMD, for example, determines that a user's eye is in a particular location or position, the display can render content to include the distortion correction in an attempt to remove or at least mitigate pupil swim and/or other undesirable optical phenomena resulting from an optics block.

Content store 108 receives the captured images from camera 110 for storage and provides the images to Measurement Module 106 for analysis. Content store 108 may further store the distortion corrections for each location, as well as other system information.

Figure 2:
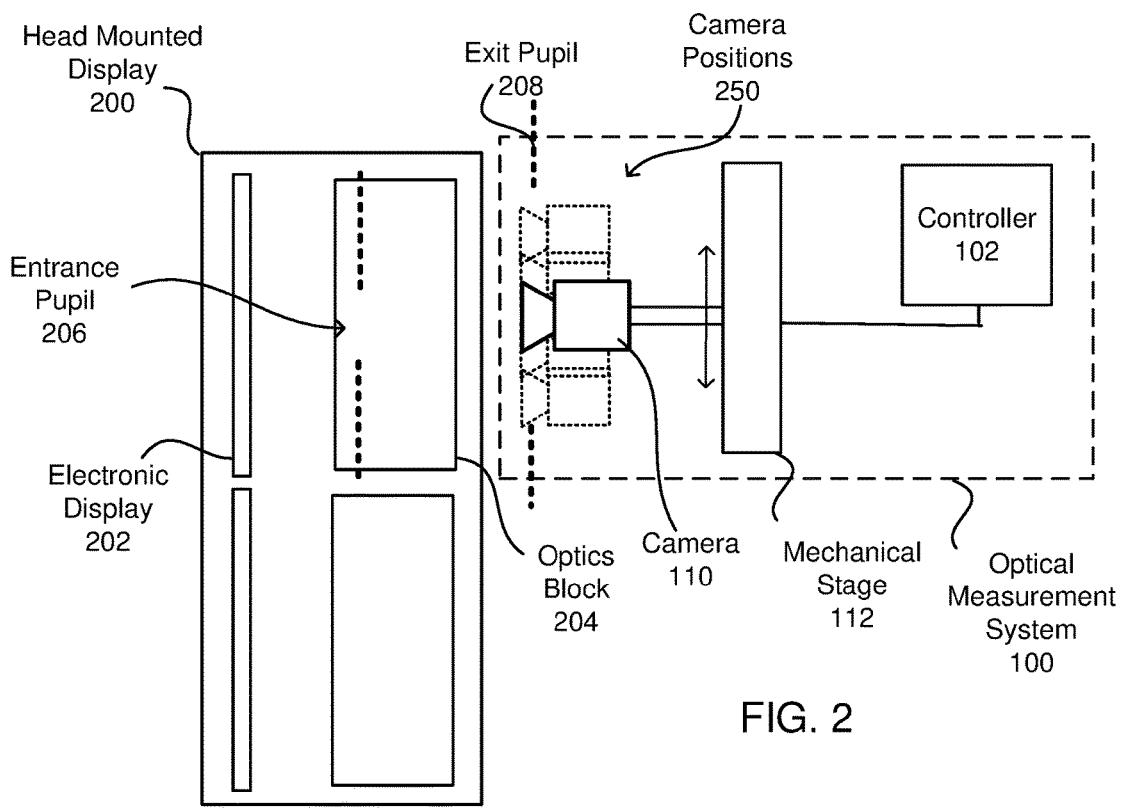
FIG. 2 shows an example optical measurement system for determining distortion as a function of position for a head mounted display (HMD), in accordance with at least one embodiment.

FIG. 2 shows an example optical measurement system 100 for determining distortion as a function of position for a head mounted display (HMD) 200, according to an embodiment. HMD 200 includes an electronic display 202 for each eye of a user. Electronic display 202 displays content, such images or video of a virtual or augmented reality scene to the user and light of the content displayed on electronic display 202 is directed to each of the user's eyes by an optics block 204. Optics block 204 is associated with an entrance pupil 206 and an exit pupil 208. Entrance pupil 206 is an optical image of a physical aperture stop, as 'seen' through the optics block 204 looking toward the camera 101. The corresponding image of the aperture as seen through the optics block 204 towards electronic display 202 is the exit pupil 208. Accordingly, optical measurement system 100 determines distortion as a function of position adjacent head mounted display (HMD) 200 by capturing images of a target image displayed on electronic display 202 with camera 110. Camera 110 is moved into various camera positions 250 by mechanical stage 112 to capture the images around exit pupil 208 (corresponds to a location an eye of a user wearing HMD 200 would occupy).

Figure 3:
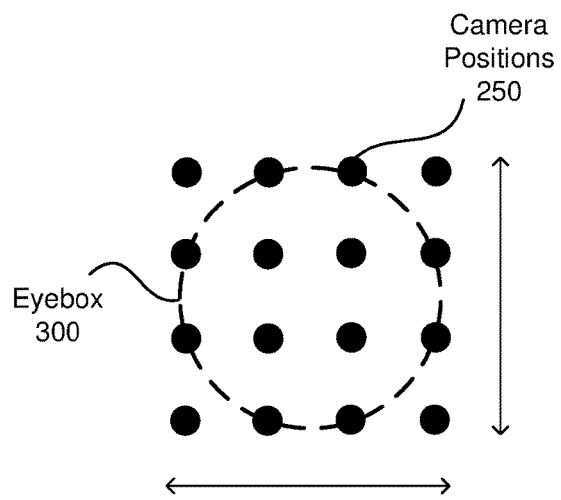
FIG. 3 shows example image capture locations adjacent an exit pupil, in accordance with at least one embodiment.

FIG. 3 shows a front view of example camera positions 250 corresponding to image capture locations around eyebox 300 and adjacent exit pupil 208, according to an embodiment. In some embodiments, optics block 204 is an optical collimator that produces a cylinder of parallel light and content displayed on electronic display 202 can be viewed while a user's pupil is within this cylinder. In some embodiments, optics block 204 may cause the light to diverge or converge. The area associated with the light leaving optics block 204 is referred to as the eyebox (i.e., eyebox 300). Accordingly, the instructions of Image Capture Automation Module 104 cause mechanical stage 112 to move camera 110 to the different camera positions 250 around eyebox 300. Since the distortion caused by optics block 204 is not uniform across eyebox 300, the images are captured to determine how distortion changes from each of the different camera positions 250. In this example, FIG. 3 shows 25 camera positions 250 corresponding to images of the target image being captured over a 4×4 mm area across eyebox 300. In another example, 625 images are captured for a 25×25 mm area across exit pupil 208 including an area inside and outside of eyebox 300. The number of images and size of the area around eyebox 300 can vary and the distortion measurement between the different camera positions 250 can be interpolated to generate a measurement for the distortion at each location around eyebox 300.

In one embodiment, the target image includes a pattern or set of features, such a checkerboard pattern, a barcode, and so forth. The locations of features in the target image are known in order to compare the location of a respective feature to the observed location of that feature captured in an image for a respective camera position of the different camera positions 250. In one embodiment, the pattern or set of features is not uniform across the target image to allow for ease of computer vision processing and to allow for potential spot cross-overs between images corresponding to adjacent camera positions 250 with overlapping field of views. After the images are captured, the differences between the expected or ideal location of features in the target image and the observed locations of those features in the captured images are determined by first observing the ray angle of light at each of camera positions 250.

Figure 4A:
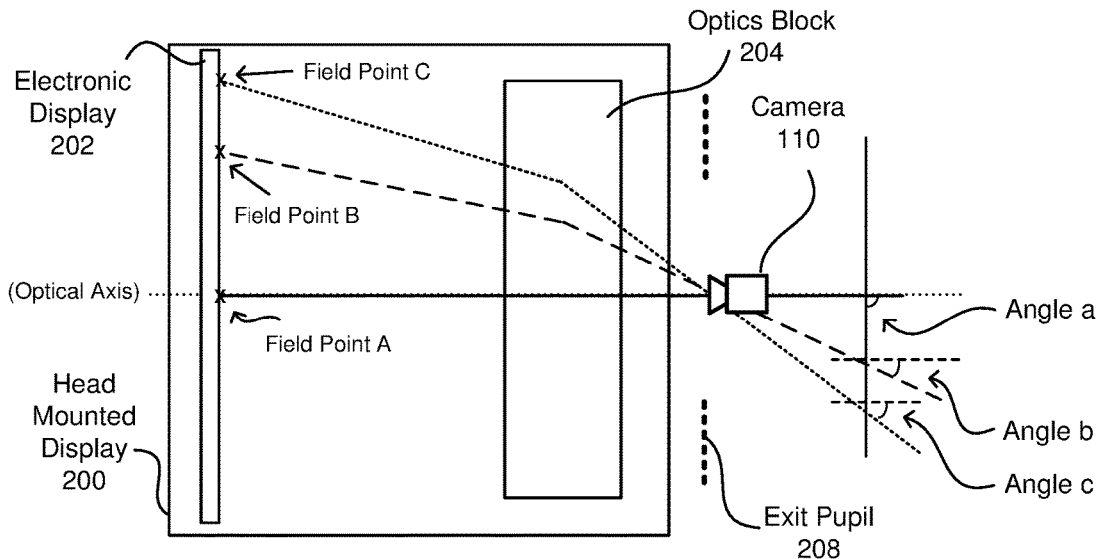
FIG. 4A shows a camera measuring ray angles along an optical axis of an optics block of a head-mounted display, according to an embodiment.

FIG. 4A shows camera 110 measuring ray angles along an optical axis of an optics block 204 of HMD 200, according to an embodiment. In this example, rays are illustrated for three field points (A, B, C) of a target image displayed on electronic display 202. A chief ray angle refers to the angle of incidence of an off-axis ray passing through the center of exit pupil 208. In this example, camera 110 represents the image plane and the rays corresponding to field point B and field point C are exemplary chief rays because they are each located off axis and pass through the center of exit pupil 208. Accordingly, the rays for each field point intersect at the image plane where camera 110 is located and are extended, in this example, beyond camera 110 to illustrate their respective ray angles. The on-axis ray angle measurement (angle a) for the on-axis field point A is 0 since field point A is located on the optical axis. The ray angle and, as a result, distortion tend to become larger as a function of distance from the optical axis. Thus, the chief ray angle (angle b) of the chief ray for field point B is less than the angle (angle c) of the chief ray for field point C. Accordingly, in this example, the measured height of the chief ray for field point B is $y_{chief\_B}$=tan(angle b)*EFL, where EFL is effective focal length, and $y_{chief\_C}$=tan(angle c)*EFL. Accordingly, the measured distortion is:

$$\text{Distortion} = \frac{y_{chief} - y_{ref}}{y_{ref}} * 100\% \quad (1)$$

Where $y_{ref}$ is the coordinate or actual height of the field point on display 402.

As discussed above, distortion changes as a function of position within eyebox 300 (Px, Py), which is the main constituent of "non-MTF-impacting pupil swim." As the camera 110 shifts laterally to measure distortion, aberrations across the whole lens can be calculated from transverse ray errors in angle space. For example, the transverse ray aberrations can be expressed in transverse ray angle errors, E(Px,Py), where (Px,Py) is a coordinate on exit pupil 208. Accordingly, the transverse ray angle errors E(Px,Py) can be measured as the change in ray angle as camera 110 moves from on-axis to off-axis:

$$E(Px,Py)=\text{Ray\_angle}(Px,Py)-\text{Ray\_angle}(0,0) \quad (2)$$

Figure 4B:
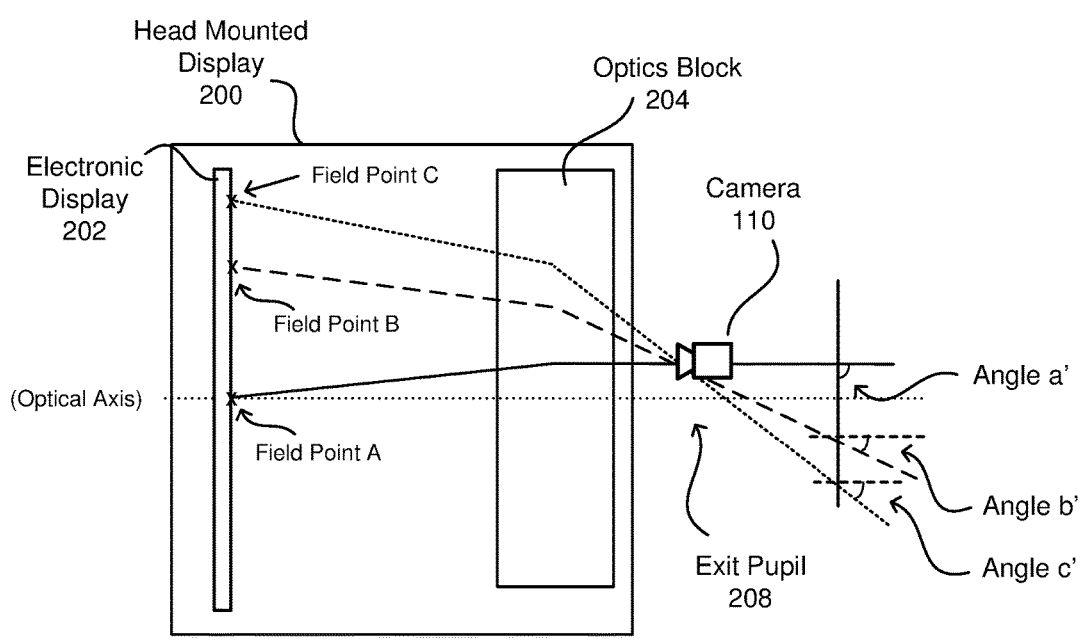
FIG. 4B shows camera measuring off-axis ray angles from an optical axis of an optics block of a head-mounted display, according to an embodiment.

FIG. 4B shows camera 110 measuring off-axis ray angles from the optical axis of optics block 204 of HMD 200, according to an embodiment. In this example, rays for the same three field points (A, B, C) of the same target image displayed on electronic display 202 in FIG. 4A are illustrated for the instance when camera 110 captures an image that includes field points (A, B, C) off-axis or from a distance above the optical axis. Accordingly, in this example, the ray angle measurement for field point A is angle a', the ray angle for field point B is angle b', and the ray angle for field point C is angle c' and the transverse ray angle errors for field points A, B, and C are (angle a'-angle a), (angle b'-angle b), and (angle c'-angle c). The transverse ray angle error measurement may additionally include color information. For example, the offset Ray_angle (0,0) can be defined as the reference wavelength (often green for visible applications). The display sub-pixel pitch may need to be subtracted out if electronic display 202 is not color sequential.

As discussed above, "non-MTF-impacting pupil swim" can be analyzed by identifying or determining the change of distortion as the pupil shifts. In another embodiment, "non-MTF-impacting pupil swim" can be determined by first determining the change in transverse ray aberrations:

$$\Delta E(Px,Py)=E(x,y)(Px,Py)-E(0,0)(Px,Py) \quad (3)$$

Where $\Delta E(Px,Py)$ is the change in transverse ray aberrations, $E(x,y)(Px,Py)$ is the transverse ray aberration of any field point (x,y), and $E(0,0)(Px,Py)$ is the on-axis transverse ray aberration. $\Delta E(Px,Py)$ removes field-independent aberrations, such as defocus and spherical aberrations, which is the same as removing uniform distortion. If only field-independent aberrations are present, distortion does not change as a function of lateral pupil location; however, the image shifts uniformly as the pupil shifts laterally, and the "MTF-impacting pupil swim" is still present.

In one embodiment, if the system is circularly symmetric, camera 110 may capture images along a radius to collect the necessary aberration/pupil swim information of an optical system. For non-circularly symmetric optical systems or systems with misalignments, camera 110 may capture images of a larger area corresponding to the general location of a user's pupil or the area corresponding to eyebox 300 to capture enough information to generate a full representation of the wavefront. To detect misalignments such as centration, tip/tilt, camera 110 can scan a few points around the optical axis instead of scanning the full area associated with eyebox 300. Accordingly, the wavefront can be decomposed in polynomials, such as Zernike polynominals, for further analysis, and the MTF of the system can be calculated. When a particular pupil size is specified, by combining aberration measurements and diffraction, effects of pupil swim on image quality can be simulated by image simulation using field-dependent point spread functions.

Figure 5:
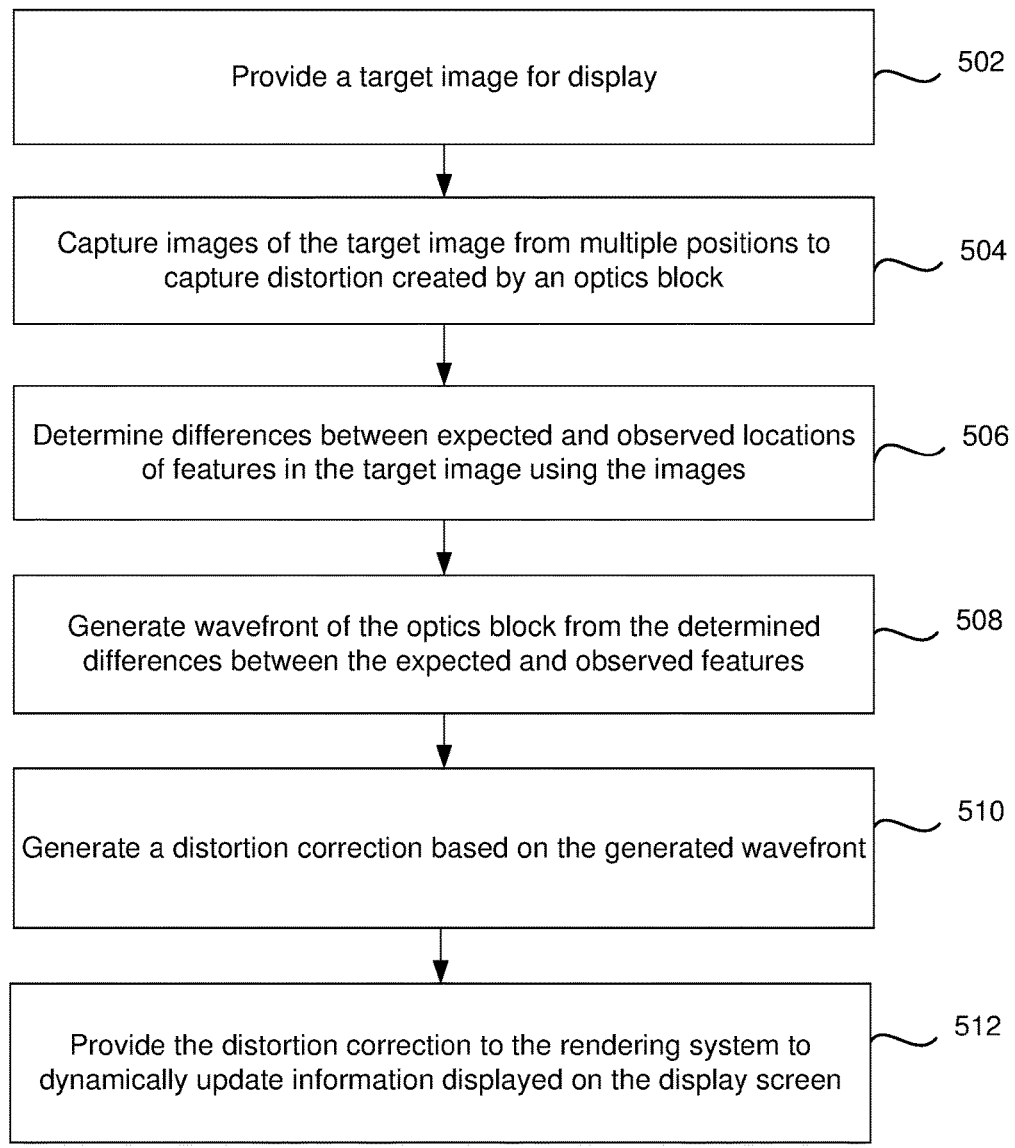
FIG. 5 shows a process for calibrating a head-mounted display to correct for pupil swim, according to an embodiment.

FIG. 5 shows a process 500 for calibrating HMD 200 to correct for pupil swim, according to an embodiment. The process of FIG. 5 may be performed by the optical measurement system 100. Other entities may perform some or all of the steps of the process in other embodiments. Likewise, embodiments may include different and/or additional steps, or perform the steps in different orders.

To measure pupil swim, a target image is provided 502 for display on electronic display 202 of HMD 200. The target image, as discussed above, includes a pattern or set of features, such a checkerboard pattern, a barcode, and so forth. Images of the target image as the target image appears from the exit pupil of HMD 200 are captured 504 using camera 110.

The optical measurement system 100 captures 504 images of the target image from various positions around exit pupil 208. Multiple images of the target image are captured from various positions around exit pupil 208 to observe the distortion created by optics block 204 from various angles and/or locations. The optical measurement system 100 includes a camera and a mechanical stage motorized to move the camera in the x-y direction. In one embodiment, the camera is a pinhole camera that is distortion calibrated such that distortion from the camera can be removed to allow each pixel of the camera to correspond to an absolute angle measurement.

The optical measurement system 100 determines 506 differences between expected and observed locations of features in the target images using the captured images. The determined differences are between the expected locations of features in the target image relative to observed locations of the features in the images of the distorted target image captured from exit pupil 208 after light from the target image passes through optics block 204. For example, the target image includes a pattern, such as a checkerboard pattern or an array of points, and features of the calibration image, such as the actual, ideal, or theoretical location of features, are compared to the observed location of those features captured (or observed) by the camera. Displacement between the observed locations of the features and the actual locations of the features is directly proportional to the gradient of the wavefront of light from the optics block 204. Displacements, or "tilts," between one or more features or points in the distorted target image and in the target image are determined by comparing features of the distorted target image to the ideal or reference location of those features in target image for each camera position. Accordingly, the different camera positions allow determination of a wavefront, while providing a greater sensitivity and a greater field of view than a Shack-Hartmann sensor or other wavefront sensors. Thus, the difference between the expected and observed location of the features are used to reconstruct the wavefront of the light leaving the electronic display 202.

Accordingly, the optical measurement system 100 generates 508 a wavefront based on the determined differences. For example, changes to the wavefront of light from electronic display 202 can be estimated as the wavefront passes through optics block 204. For example, the rate of change or slope of the wavefront can be computed from the displacements for a least-squares fitting with derivatives of Zernike polynomials. Thus, analysis of the reconstructed wavefront can then identify which portions of the wavefront are out of phase as a result of the optical aberration of the optics block, which can be performed on a pixel by pixel basis. Additionally, wavefront information corresponding to viewing locations between camera views or positions for which images of target image were not captured can be interpolated to allow for the determination of a continuous model or function of the wavefront. Such a model or function allows distortion corrections to be provided for substantially all potential eye positions relative to the exit pupil at a high granularity based on a set of discrete points corresponding to the discrete camera positions from which images were captured.

The optical measurement system 100 generates 510 a distortion correction is generated from the reconstruction and analysis of the wavefront. The distortion correction is generated to pre-distort images that are to be displayed on electronic display 202 by, for example, introducing compensative phase delays that cause the light of the scene displayed by the electronic display 202 to be in phase upon passing though the optics block 204. Thus, the optical aberrations of the optics block 204 un-distort or cancel the pre-distortion added to the scene by the distortion correction to allow the scene to arrive at the exit pupil of the HMD 200 free of optical aberrations (or at least lessened in degree). Thus, the distortion correction provides a scene rendering module with instructions for adjusting the rendering of content displayed on electronic display 202 while a user's eye is in a position corresponding to a particular distortion correction to mitigate pupil swim. Thus, the distortion correction can be considered pre-distortion that is corrected by distortion inherent to the HMD 200 to provide content for display on electronic display 202 with no apparent optical errors. Hence, distortion corrections corresponding to various positions of a user's eye are provided 512 to a scene rendering module to modify information displayed on electronic display 202 to compensate for distortion caused by optics block 204 and remove or at least mitigate pupil swim. The application of the distortion correction to a virtual scene on a HMD is further described in U.S. application Ser. No. 14/963,127, which is incorporated by reference in their entirety.

Additionally, distortion information for a single field point also contains aberration information. Thus, in one embodiment, a single measurement can obtain on-axis and off-axis aberration information by analyzing the offset to an abbe-sine condition. In this embodiment, the one or more lenses of the optical system may need to be flipped before pupil swim for the optical system can be determined. A transverse aberration curve can be generated by tracking how individual field points move between the different images captured from different positions. When a particular pupil size is specified, pupil swim can be simulated using field-dependent point spread functions while combining aberration measurements and diffraction. Accordingly, aberrations can be measured or reconstructed by calculating Seidel coefficients from a transverse ray aberration plot obtained from the pupil swim measurements using a Zernike reconstruction (zonal or modal) or a Zernike reconstruction using a wavefront map, for example.

Head Mounted Display Environment Overview

Figure 6:
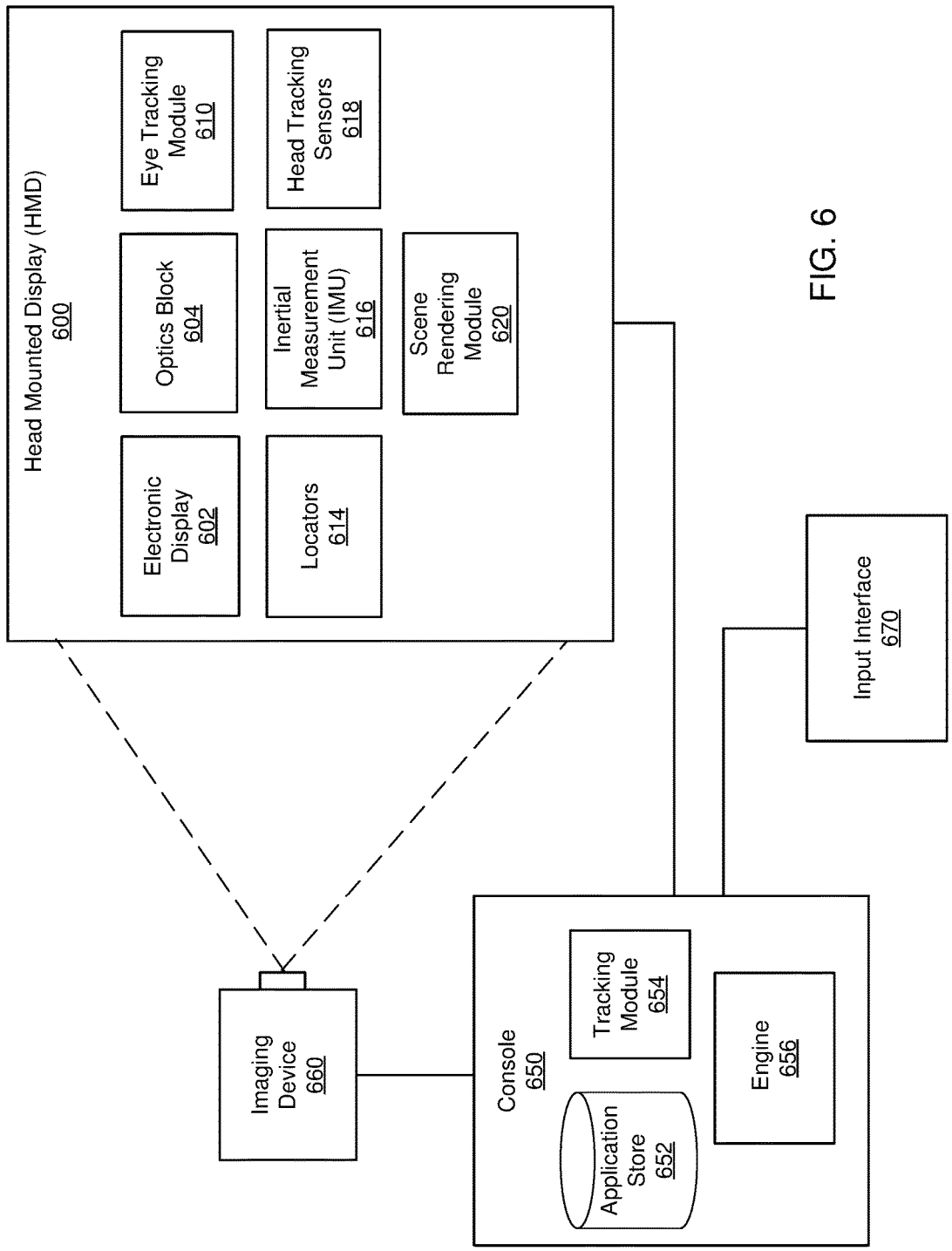
FIG. 6 shows an example system, in accordance with at least one embodiment.

FIG. 6 is system environment in which a console 650 operates. In this example, the system environment includes head mounted display (HMD) 600, imaging device 660, and input interface 670, which are each coupled to console 650. While FIG. 6 shows a single HMD 600, a single imaging device 660, and a single input interface 670, in other embodiments, any number of these components may be included in the system. For example, there may be multiple HMDs 600 each having an associated Input interface 670 and being monitored by one or more imaging devices 660, with each HMD 600, input interface 670, and imaging devices 160 communicating with the Console 650. In alternative configurations, different and/or additional components may also be included in the VR system environment.

HMD 600 is a Head-Mounted Display (HMD) that presents content to a user. Example content includes images, video, audio, or some combination thereof. Audio content may be presented via a separate device (e.g., speakers and/or headphones) external to HMD 600 that receives audio information from HMD 600, Console 650, or both. HMD 600 includes electronic display 602, optics block 604, eye tracking module 610, one or more locators 614, internal measurement unit (IMU) 616, head tracking sensors 618, and scene rendering module 620.

Optics block 604 directs light from electronic display 602 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 604 may have one or more coatings, such as anti-reflective coatings. Magnification of the image light by optics block 604 allows electronic display 602 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Optics block 604 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to electronic display 602 for display is pre-distorted, and optics block 604 corrects the distortion when it receives image light from electronic display 602 generated based on the content.

Eye tracking module 610 tracks an eye position and eye movement of a user of HMD 600. A camera or other optical sensor inside HMD 600 captures image information of a user's eyes, and eye tracking module 610 uses the captured information to determine interpupillary distance, interocular distance, a three-dimensional (3D) position of each eye relative to HMD 600 (e.g., for distortion adjustment purposes), including a magnitude of torsion and rotation (i.e., roll, pitch, and yaw) and gaze directions for each eye. In one example, infrared light is emitted within HMD 600 and reflected from each eye. The reflected light is received or detected by the camera and analyzed to extract eye rotation from changes in the infrared light reflected by each eye. Many methods for tracking the eyes of a user can be used by eye tracking module 610. Accordingly, eye tracking module 610 may track up to six degrees of freedom of each eye (i.e., 3D position, roll, pitch, and yaw) and at least a subset of the tracked quantities may be combined from two eyes of a user to estimate a 3D gaze position. For example, eye tracking module 610 integrates information from past measurements, measurements identifying a position of a user's head, and 3D information describing a scene presented by electronic display element 602. Thus, information for the position and orientation of the user's eyes is used to determine a 3D location or position in a virtual scene presented by HMD 600 where the user is looking.

Further, the relative 3D position between a pupil and optics block 604 changes as the eye moves to look in different directions. As the relative 3D position between the pupil and the optics block 604 changes, the way that light goes through optics block 604 and focuses changes, and the resulting change in distortion and image quality as perceived by the user is referred to as "pupil swim". Accordingly, measuring distortion in different eye positions and pupil distances relative to optics block 104 and generating distortion corrections for different positions and distances allows mitigation of distortion change caused by "pupil swim" by tracking the 3D position of a user's eyes and applying a distortion correction corresponding to the 3D position of each of the user's eye at a given point in time. Thus, the 3D position of each of a user's eyes allows mitigation of distortion caused by changes in the distance between the pupil of the eye and optics block 104.

Locators 614 are objects located in specific positions on HMD 600 relative to one another and relative to a specific reference point on HMD 600. Locator 614 may be a light emitting diode (LED), a corner cube reflector, a reflective marker, a type of light source that contrasts with an environment in which HMD 600 operates, or some combination thereof. Active locators 614 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 614 can be located beneath an outer surface of HMD 600, which is transparent to the wavelengths of light emitted or reflected by locators 614 or is thin enough not to substantially attenuate the wavelengths of light emitted or reflected by locators 614. Further, the outer surface or other portions of HMD 600 can be opaque in the visible band of wavelengths of light. Thus, locators 614 may emit light in the IR band while under an outer surface of HMD 600 that is transparent in the IR band but opaque in the visible band.

IMU 616 is an electronic device that generates fast calibration data based on measurement signals received from one or more of head tracking sensors 618, which generate one or more measurement signals in response to motion of HMD 600. Examples of head tracking sensors 618 include accelerometers, gyroscopes, magnetometers, other sensors suitable for detecting motion, correcting error associated with IMU 616, or some combination thereof. Head tracking sensors 618 may be located external to IMU 616, internal to IMU 616, or some combination thereof.

Based on the measurement signals from head tracking sensors 618, IMU 616 generates fast calibration data indicating an estimated position of HMD 600 relative to an initial position of HMD 600. For example, head tracking sensors 618 include multiple accelerometers to measure translational motion (forward/back, up/down, left/right) and multiple gyroscopes to measure rotational motion (e.g., pitch, yaw, and roll). IMU 616 can, for example, rapidly sample the measurement signals and calculate the estimated position of HMD 600 from the sampled data. For example, IMU 616 integrates measurement signals received from the accelerometers over time to estimate a velocity vector and integrates the velocity vector over time to determine an estimated position of a reference point on HMD 600. The reference point is a point that may be used to describe the position of HMD 600. While the reference point may generally be defined as a point in space, in various embodiments, reference point is defined as a point within HMD 600 (e.g., a center of the IMU 130). Alternatively, IMU 616 provides the sampled measurement signals to console 650, which determines the fast calibration data.

IMU 616 can additionally receive one or more calibration parameters from console 650. As further discussed below, the one or more calibration parameters are used to maintain tracking of HMD 600. Based on a received calibration parameter, IMU 616 may adjust one or more IMU parameters (e.g., sample rate). In some embodiments, certain calibration parameters cause IMU 616 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 620 receives content for the virtual scene from engine 656 and provides the content for display on electronic display 602. Additionally, scene render module 620 can adjust the content based on information from eye tracking module 610, IMU 616, and head tracking sensors 618. For example, upon receiving the content from engine 656, scene render module 620 adjusts the content based on the determined position of the user's eye relative to the exit pupil by adding a correction or pre-distortion into rendering of the virtual scene to compensate or correct for the distortion caused at the determined position of the user's eye to mitigate pupil swim and/or other optical aberrations at the determined position. Additionally, scene render module 620 determines a portion of the content to be displayed on electronic display 602 based on one or more of tracking module 654, head tracking sensors 618, or IMU 616, as described further below.

Imaging device 660 generates slow calibration data in accordance with calibration parameters received from console 650. Slow calibration data includes one or more images showing observed positions of locators 614 that are detectable by imaging device 660. Imaging device 660 may include one or more cameras, one or more video cameras, other devices capable of capturing images including one or more locators 614, or some combination thereof. Additionally, imaging device 660 may include one or more filters (e.g., for increasing signal to noise ratio). Imaging device 660 is configured to detect light emitted or reflected from locators 614 in a field of view of imaging device 660. In embodiments where locators 614 include passive elements (e.g., a retroreflector), imaging device 660 may include a light source that illuminates some or all of locators 614, which retro-reflect the light towards the light source in imaging device 660. Slow calibration data is communicated from imaging device 660 to Console 650, and imaging device 660 receives one or more calibration parameters from Console 650 to adjust one or more imaging parameters (e.g., focal length, focus, frame rate, ISO, sensor temperature, shutter speed, aperture, etc.).

Input interface 670 is a device that allows a user to send action requests to console 650. An action request is a request to perform a particular action. For example, an action request may be to start or end an application or to perform a particular action within the application. Input interface 670 may include one or more input devices. Example input devices include a keyboard, a mouse, a game controller, or any other suitable device for receiving action requests and communicating the received action requests to console 650. An action request received by input interface 670 is communicated to console 650, which performs an action corresponding to the action request. In some embodiments, input interface 670 may provide haptic feedback to the user in accordance with instructions received from console 650. For example, haptic feedback is provided by the input interface 670 when an action request is received, or console 650 communicates instructions to input interface 670 causing Input interface 670 to generate haptic feedback when console 650 performs an action.

Console 650 provides content to HMD 600 for presentation to the user in accordance with information received from imaging device 660, HMD 600, or input interface 670. In the example shown in FIG. 6, Console 650 includes application store 652, tracking module 654, and engine 656. Some embodiments of console 650 have different or additional modules than those described in conjunction with FIG. 6. Similarly, the functions further described below may be distributed among components of console 650 in a different manner than is described here.

Application store 652 stores one or more applications for execution by console 650. An application is a group of instructions, that when executed by a processor, generates content for presentation to the user. Content generated by an application may be in response to inputs received from the user via movement of HMD 600 or interface device 670. Examples of applications include gaming applications, conferencing applications, video playback application, or other suitable applications.

Tracking module 654 calibrates the system using one or more calibration parameters and may adjust one or more calibration parameters to reduce error in determining position of HMD 600. For example, tracking module 654 adjusts the focus of imaging device 660 to obtain a more accurate position for observed locators 614 on HMD 600. Moreover, calibration performed by tracking module 654 also accounts for information received from IMU 616. Additionally, if tracking of HMD 600 is lost (e.g., imaging device 660 loses line of sight of at least a threshold number of locators 614), tracking module 654 re-calibrates some or all of the VR system components.

Additionally, tracking module 654 tracks the movement of HMD 600 using slow calibration information from imaging device 660 and determines positions of a reference point on HMD 600 using observed locators from the slow calibration information and a model of HMD 600. Tracking module 654 also determines positions of the reference point on HMD 600 using position information from the fast calibration information from IMU 616 on HMD 600. Additionally, tracking module 654 may use portions of the fast calibration information, the slow calibration information, or some combination thereof, to predict a future location of HMD 600, which is provided to Engine 656.

Engine 656 executes applications within the VR system and receives position information, acceleration information, velocity information, predicted future positions, or some combination thereof for HMD 600 from tracking module 654. Based on the received information, engine 656 determines content to provide to HMD 600 for presentation to the user, such as a virtual scene. For example, if the received information indicates that the user has looked to the left, engine 656 generates content for HMD 600 that mirrors or tracks the user's movement in a virtual environment. Additionally, Engine 656 performs an action within an application executing on console 650 in response to an action request received from the input interface 670 and provides feedback to the user that the action was performed. The provided feedback may be visual or audible feedback via HMD 600 or haptic feedback via Input interface 670.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a head-mounted display (HMD) configured to display a target image on an electronic display, the HMD including an optics block configured to focusing light from the electronic display to an exit pupil of the HMD, the target image including a plurality of features;
    a camera configured to capture images of the target image displayed on the electronic display of the HMD from a plurality of positions relative to an optical axis of the optics block at the exit pupil; and
    a calibration system configured to:
        determine, for each feature of at least a subset of the plurality of features of the target image in each captured image, a difference between an observed location of the feature and an expected location of the feature, the determined difference being caused by one or more optical aberrations of the optics block;
        generate a wavefront of the optics block of the HMD from the determined difference between the observed location of the feature and the expected location of the feature for each of at least the subset of the plurality of features in each captured image; and
        generate, using the generated wavefront of the optics block, one or more distortion corrections for the optics block of the HMD, wherein the distortion correction, when applied to one or more frames of a virtual scene being displayed by the electronic display of the HMD, pre-distorts the one or more frames of the virtual scene with pre-distortion that is canceled by one or more optical imperfections of the optics block as light for the one or more frames of the virtual scene with the pre-distortion passes through the optics block.

2. The system of claim 1, wherein pupil swim corresponds to a change in image quality between a first position of the plurality of positions relative to the exit pupil of the HMD and a second position of the plurality of positions relative to the exit pupil of the HMD, wherein a first distortion correction for the first position is different relative to a second distortion correction for the second position, and wherein the first distortion correction and the second distortion correction at least mitigate the change in image quality observed from the exit pupil between the first position of the plurality of positions and the second position of the plurality of positions when applied to the one or more frames of the virtual scene.

3. The system of claim 1, wherein generating the wavefront of the optics block from the determined difference between the observed location of the feature and the expected location of the feature for each of at least the subset of the plurality of features further comprises:
    interpolating values for the wavefront between each the plurality of positions of the camera for camera positions where images of the target image were not captured; and
    determining of a continuous model of the wavefront using the interpolated values for the wavefront.

4. The system of claim 1, further comprising:
    a stage coupled to the camera and configured to move the camera to the plurality of positions relative to the exit pupil.

5. The system of claim 1, wherein the camera is a pinhole camera calibrated such that each pixel of the pinhole camera corresponds to an absolute angle measurement.

6. The system of claim 5, wherein each captured image contains information for measuring an angle of a ray at each of the plurality of positions relative to the exit pupil.

7. The system of claim 1, wherein each of the one or more distortion corrections correspond to a different eye position for a user viewing content displayed by the electronic display of the HMD.

8. A system comprising:
    a head-mounted display (HMD) configured to display a target image on an electronic display, the HMD including an optics block configured to focusing light from the electronic display to an exit pupil of the HMD, the target image including a plurality of features;
    a camera configured to capture images of the target image displayed on the electronic display of the HMD from a plurality of positions of the camera relative to an optical axis of the optics block at the exit pupil; and
    a calibration system configured to:
        determine, for each feature of at least a subset of the plurality of features of the target image in each captured image, a difference between an observed location of the feature and an expected location of the feature; and
        generate a wavefront of the optics block of the HMD from the determined difference between the observed location of the feature and the expected location of the feature for each of at least the subset of the plurality of features in each captured image.

9. The system of claim 8, wherein the determined difference between the observed location of the feature and the expected location of the feature being caused by one or more optical aberrations of the optics block.

10. The system of claim 8, wherein pupil swim corresponds to a change in image quality between a first position of the plurality of positions relative to the exit pupil of the HMD and a second position of the plurality of positions relative to the exit pupil of the HMD.

11. The system of claim 8, wherein the calibration system is further configured to:
    generate, using the generated wavefront of the optics block, one or more distortion corrections for the optics block of the HMD, wherein the distortion correction, when applied to one or more frames of a virtual scene being displayed by the electronic display of the HMD, pre-distorts the one or more frames of the virtual scene with pre-distortion that is canceled by one or more optical imperfections of the optics block as light for the one or more frames of the virtual scene with the pre-distortion passes through the optics block.

12. The system of claim 11, wherein a first distortion correction for the first position is different relative to a second distortion correction for the second position, and wherein the first distortion correction and the second distortion correction at least mitigate the change in image quality observed from the exit pupil between the first position of the plurality of positions and the second position of the plurality of positions when applied to the one or more frames of the virtual scene.

13. The system of claim 11, wherein each of the one or more distortion corrections correspond to a different eye position for a user viewing content displayed by the electronic display of the HMD.

14. The system of claim 8, wherein generating the wavefront of the optics block from the determined difference between the observed location of the feature and the expected location of the feature for each of at least the subset of the plurality of features further comprises:
interpolating values for the wavefront between each the plurality of positions of the camera for camera positions where images of the target image were not captured; and
determining of a continuous model of the wavefront using the interpolated values for the wavefront.

15. The system of claim 8, further comprising:
a stage coupled to the camera and configured to move the camera to the plurality of positions relative to the exit pupil.

16. The system of claim 8, wherein the camera is a pinhole camera calibrated such that each pixel of the pinhole camera corresponds to an absolute angle measurement, and wherein each captured image contains information for measuring an angle of a ray at each of the plurality of positions relative to the exit pupil.

17. A method comprising:
displaying a target image on a display screen of a head mounted display (HMD) that includes an optics block focusing light from the display screen to an exit pupil of the HMD;
capturing images of the target image displayed on the display screen of the HMD from a plurality of positions of the camera relative to an optical axis of the optics block at the exit pupil;
determining, for each feature of at least a subset of the plurality of features of the target image in each captured image, a difference between an observed location of the feature and an expected location of the feature, the determined difference being caused by one or more optical aberrations of the optics block;
generating a wavefront of the optics block of the HMD from the determined difference between the observed location of the feature and the expected location of the feature for each of at least the subset of the plurality of features in each captured image
generating, using the generated wavefront of the optics block, one or more distortion corrections for the optics block of the HMD, wherein the distortion correction, when applied to one or more frames of a virtual scene being displayed by the electronic display of the HMD, pre-distorts the one or more frames of the virtual scene with pre-distortion that is canceled by one or more optical imperfections of the optics block as light for the one or more frames of the virtual scene with the pre-distortion passes through the optics block; and
providing distortion corrections corresponding to the plurality of positions of the camera to a rendering system of the HMD.

18. The method of claim 17, wherein capturing images of the target image via the camera at the exit pupil from the plurality of positions of the camera relative to the optical axis of the optics block comprises:
moving a robotic arm coupled to the camera to move the camera to each of the plurality of positions of the camera relative to the optical axis of the optics block at the exit pupil.

19. The method of claim 17, further comprising:
determining, using an eye tracking system of the HMD, a current position of an eye of a viewing user wearing the HMD and viewing content being displayed by the display screen of the HMD;
selecting a distortion correction for the current position of the eye from a plurality of distortion corrections, each distortion correction of the plurality of distortion corrections corresponding to a different eye position;
applying the selected distortion correction to a virtual scene for the current position of the eye of the viewing user; and
displaying the virtual scene on the display screen with the selected distortion correction for the current position of the eye.

20. The method of claim 19, further comprising:
tracking, using the eye tracking system, the eye of the viewing user to an updated position;
selecting an alternative distortion correction from the plurality of distortion corrections for the updated position of the eye of the user;
applying the alternative distortion correction to the virtual scene for the updated position of the eye; and
displaying the virtual on the display screen with the alternative distortion correction.

* * * * *